Figure 5:
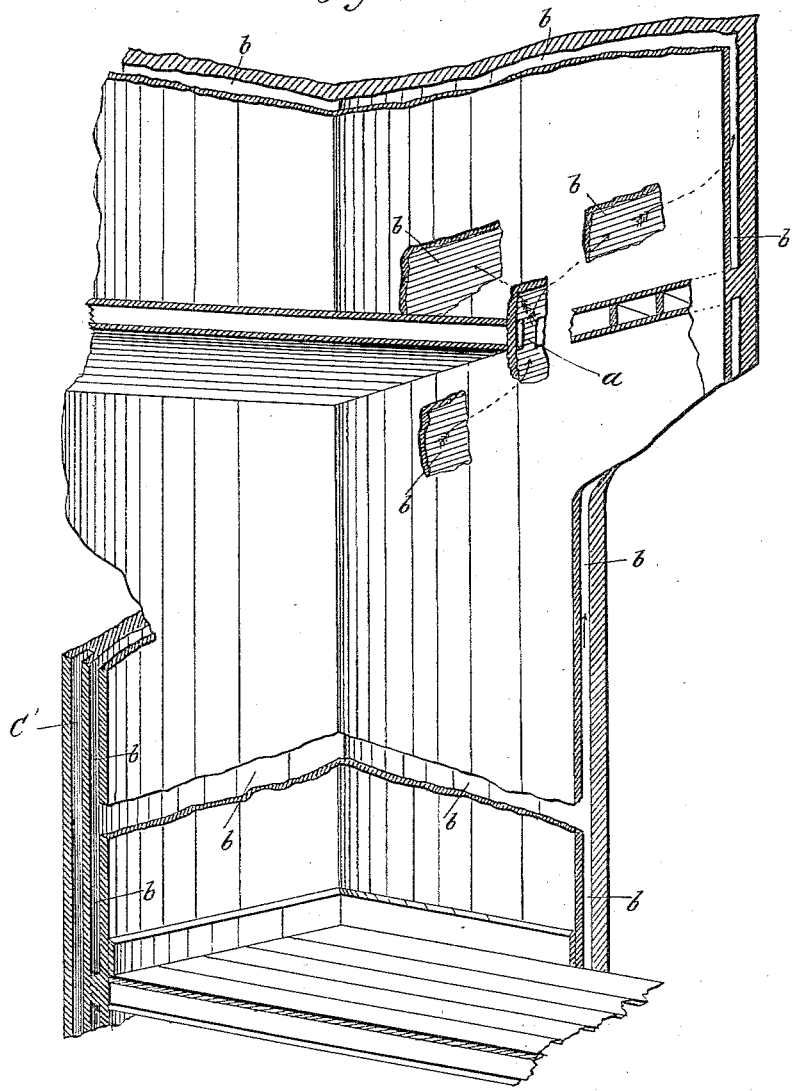

(No Model.) 3 Sheets—Sheet 1.
J. D. PARKER.
MURAL HEATING SYSTEM.
No. 389,003. Patented Sept. 4, 1888.
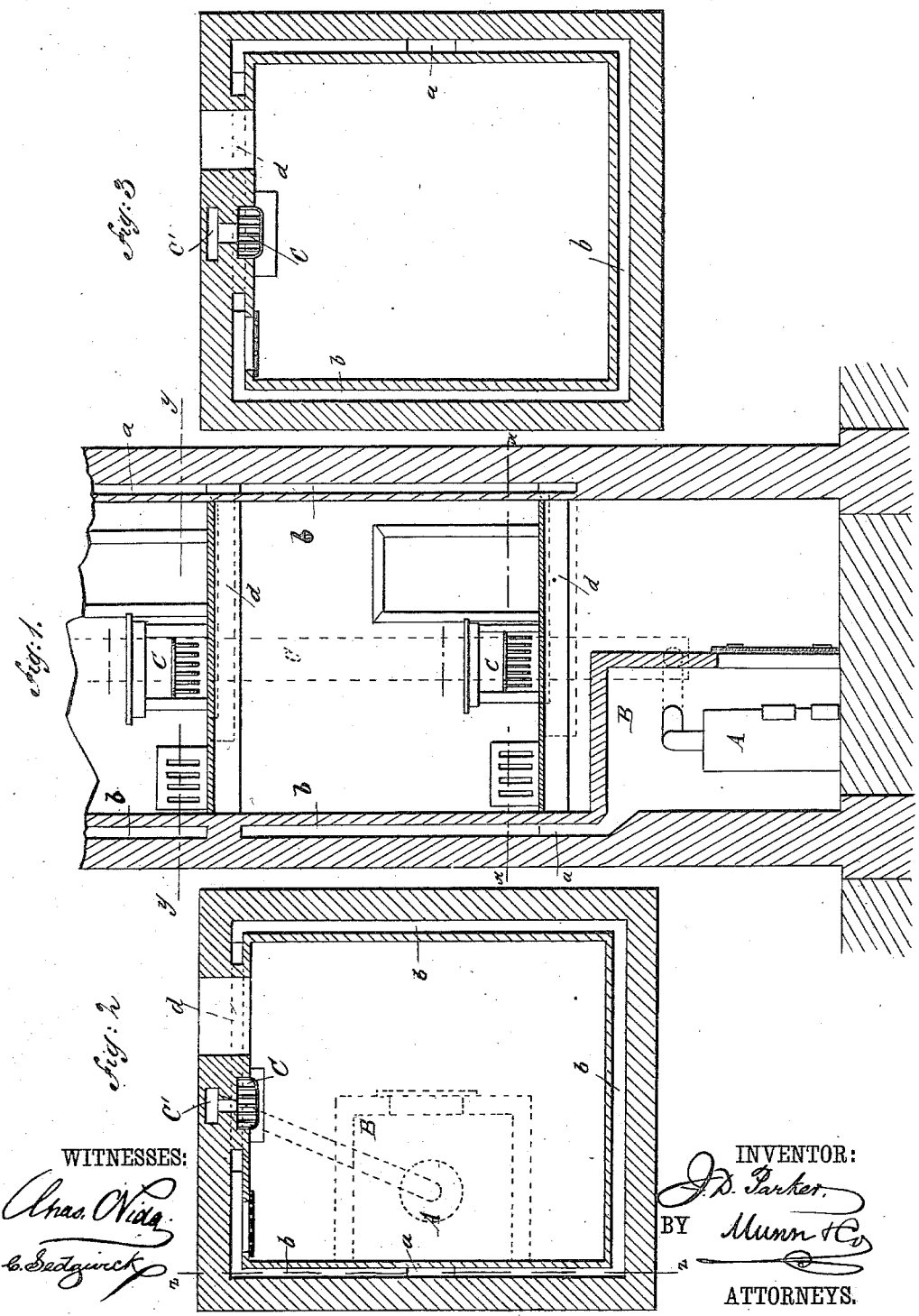
WITNESSES:
INVENTOR:
J. D. Parker,
BY Munn & Co
ATTORNEYS.

(No Model.)
J. D. PARKER.
MURAL HEATING SYSTEM.
No. 389,003. Patented Sept. 4, 1888.
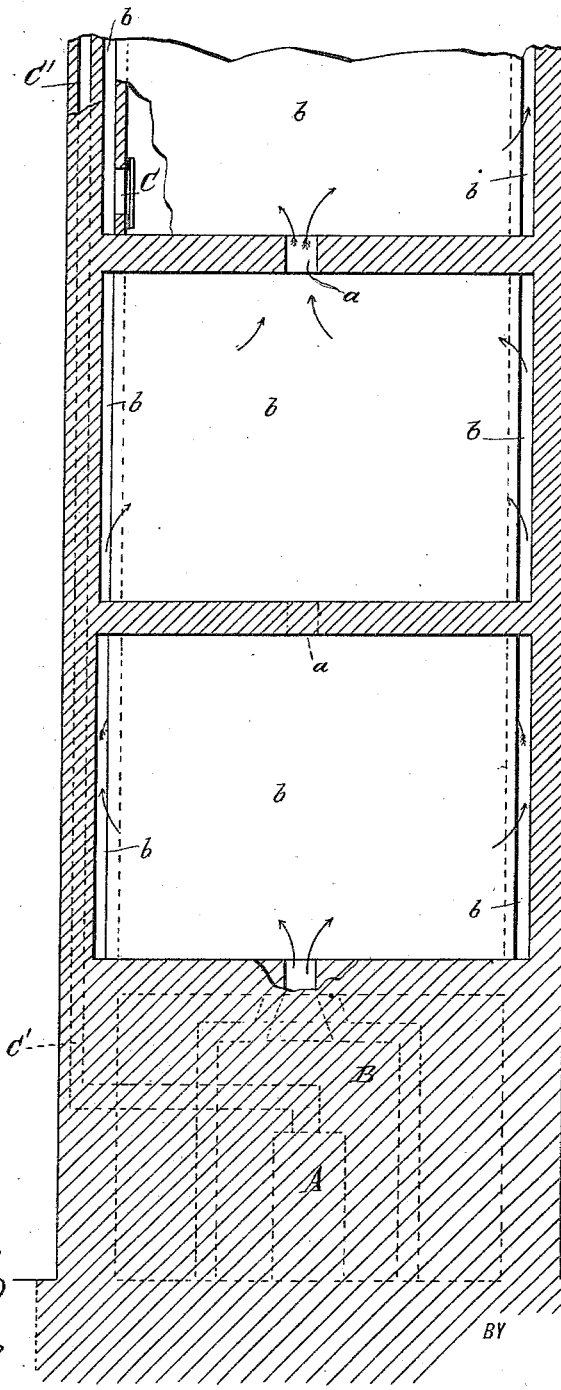
WITNESSES:
INVENTOR.
BY
ATTORNEY.

(No Model.) 3 Sheets—Sheet 3.

J. D. PARKER.
MURAL HEATING SYSTEM.

No. 389,003. Patented Sept. 4, 1888.

WITNESSES:
Chas. Nida
C. Sedgwick

INVENTOR.
J. D. Parker
BY Munn & Co.
ATTORNEY.

UNITED STATES PATENT OFFICE.

JOHN D. PARKER, OF FORT RILEY, KANSAS.

MURAL HEATING SYSTEM.

SPECIFICATION forming part of Letters Patent No. 389,003, dated September 4, 1888.

Application filed April 25, 1887. Serial No. 236,099. (No model.)

*To all whom it may concern:*

Be it known that I, JOHN D. PARKER, of Fort Riley, in the county of Davis and State of Kansas, have invented a new and Improved Mural Heating System, of which the following is a specification, reference being had to the annexed drawings, forming a part thereof, in which—

Figure 1 is a vertical section of a building heated according to my improved system. Fig. 2 is a horizontal section taken on line $x\,x$ in Fig. 1. Fig. 3 is a horizontal section taken on line $y\,y$ in Fig. 1. Fig. 4 is a vertical section on line $z\,z$, Fig. 2; and Fig. 5 is a detail perspective view.

Similar letters of reference indicate corresponding parts in all the views.

It is well known that in brick, stone, and cement buildings the walls remain cold and damp under the various systems of heating now in use, thereby rendering the house uncomfortable and unhealthy.

The object of my invention is to obviate the discomforts and difficulties arising from cold and damp walls by heating the walls themselves, and by means of the walls transmitting the greater portion of the required heat to the air in the building.

My invention consists in forming in the walls series of flues or ducts communicating with a suitable furnace located in the lower part of the building, the flues being carried around the apartments in the different stories in the body of the wall, so that the heat generated by the furnace may be communicated to the wall and by the wall communicated to the air contained by the building.

It also consists in the combination, with a system of flues, as described, and a furnace for supplying heated air thereto, of a series of grates placed in the apartments and adapted to regulate the temperature, the greater portion of the heat being supplied by the wall-flues, the remainder being furnished by the grates. By this means I not only secure uniform heat throughout the entire season, but by the employment of grates I secure the required ventilation.

In carrying out my invention I place in the lower part of the house a furnace, A, inclosed in a compartment, B, arranged to receive air from the outside of the building, and in the walls of the building I form vertical flues $a$, for conveying the heated air from one story of the building to another, and I arrange one or more horizontal flues, $b$, in the walls surrounding the apartments, the said flues extending upwardly in the wall from a point near each floor to a point near the ceiling, or a sufficient distance in a vertical direction to secure the heating-surface required for each floor. The several flues $a\,b$ are arranged in series, so that the heated air passes from the furnace to the horizontal flues $b$ of the first floor, and after passing entirely around the first floor it passes through the vertical flues $a$ to the second floor, thence through the flue $b$ of that floor, thence upward through the flue $a$, and so on throughout all of the stories of the building, the last flue, $a$, upon the top floor of the building being arranged to discharge through one or more openings into the apartments of the upper floor.

Upon each floor is arranged a fire-place, C, communicating with the chimney $C'$, formed in the wall outside of the flues $b$. In these fire-places a fire is built whenever the heat from the wall is insufficient. Wherever doors or windows occur in the wall the flues $b$ are carried around them, as shown at $d$ in Fig. 1. Should a single flue $b$ be insufficient to warm any floor, several such flues may be employed. By means of my improvement the walls are always dry and warm, and great and sudden changes of temperature are avoided.

It is obvious that I may employ steam-pipes in the horizontal and vertical flues. Therefore I do not limit or confine my invention to the exact form herein shown and described.

Having thus fully described my invention, I claim as new and desire to secure by Letters Patent—

1. In a mural heating system, the walls of a building provided with a series of vertical and horizontal hot-air flues communicating with each other and with a hot-air chamber, substantially as herein shown and described, whereby provision is made for heating the said walls, as and for the purpose set forth.

2. In a mural heating system, the horizontal hot-air flues $b$ in the walls surrounding the several apartments, and the vertical hot-air flues $a$, connecting the horizontal flues of the several floors of a building and the flue in the first floor with a furnace, substantially as herein shown and described.

JOHN D. PARKER.

Witnesses:
JOHN DAVIS,
W. J. FRANKLIN.